United States Patent
Reifman et al.

(10) Patent No.: US 12,179,730 B2
(45) Date of Patent: Dec. 31, 2024

(54) SYSTEM AND METHOD FOR PREVENTING VEHICLE ROLL-AWAY

(71) Applicant: Bendix Commercial Vehicle Systems LLC, Avon, OH (US)

(72) Inventors: Daniel S. Reifman, Cleveland, OH (US); Amit N. Chincholi, Solapur (IN); Meviltan Mendis, Pune (IN); Pinak Paralkar, Pune (IN); Niket Mokashi, Wakad (IN); Abhir Agashe, Aurangabad (IN)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 238 days.

(21) Appl. No.: 17/942,220

(22) Filed: Sep. 12, 2022

(65) Prior Publication Data

US 2024/0092323 A1 Mar. 21, 2024

(51) Int. Cl.
*B60T 7/12* (2006.01)
*B60T 8/17* (2006.01)
(Continued)

(52) U.S. Cl.
CPC .............. *B60T 8/1708* (2013.01); *B60T 7/12* (2013.01); *B60T 8/172* (2013.01); *B60T 17/18* (2013.01);
(Continued)

(58) Field of Classification Search
CPC ..... B60T 7/12; B60T 7/14; B60T 7/20; B60T 8/1708; B60T 17/18; B60T 2250/04; B60T 2270/40
(Continued)

(56) References Cited

U.S. PATENT DOCUMENTS 9,714,706 B1 7/2017 Szawarski et al.
2006/0262871 A1 11/2006 Cho et al.
(Continued)

FOREIGN PATENT DOCUMENTS

CN 108202729 A 6/2018
CN 113682288 A 11/2021
(Continued)

OTHER PUBLICATIONS

Bendix Commercial Vehicle Systems LLC, "Operator's Manual Bendix Intellipark Electronic Parking Brake Control System Bus/Non-Towing Vehicles" (2021).
(Continued)

*Primary Examiner* — Erick R Solis
(74) *Attorney, Agent, or Firm* — Reising Ethington P.C.

(57) ABSTRACT

A system for braking a vehicle includes an operator interface that transmits a brake command signal when actuated by a vehicle operator. When the interface is not actuated and does not transmit the signal, a controller receives signals indicative of whether the vehicle is in an active or inactive state from two different sources and determines that the vehicle is in the inactive state if both of the signals indicate the vehicle is in the inactive state. The controller receives another signal indicative of a speed of the vehicle and determines whether the speed of the vehicle meets a predetermined condition relative to a predetermined speed of the vehicle. The controller generates a control signal to apply a wheel parking brake on the vehicle after determining that the vehicle is the inactive state and determining that the speed of the vehicle meets the predetermined condition relative to the predetermined speed.

20 Claims, 3 Drawing Sheets

(51) Int. Cl.
  *B60T 8/172*    (2006.01)
  *B60T 17/18*    (2006.01)
(52) U.S. Cl.
  CPC ....... *B60T 2250/04* (2013.01); *B60T 2270/40* (2013.01)
(58) Field of Classification Search
  USPC .......................................................... 701/70
  See application file for complete search history.

(56) References Cited

U.S. PATENT DOCUMENTS

| | | | |
|---|---|---|---|
| 2014/0172240 A1* | 6/2014 | Schemmel | B60Q 9/00 |
| | | | 701/49 |
| 2019/0299946 A1 | 10/2019 | Miller, Jr. et al. | |
| 2020/0114896 A1 | 4/2020 | Kennedy et al. | |
| 2023/0044528 A1* | 2/2023 | Subramanian | B60T 7/16 |

FOREIGN PATENT DOCUMENTS

| | | | | |
|---|---|---|---|---|
| DE | 10357121 A1 | | 7/2005 | |
| EP | 2664505 A1 | * | 11/2013 | ............ B60T 15/041 |
| EP | 2719587 A1 | * | 4/2014 | ............ B60R 7/14 |

OTHER PUBLICATIONS

English (machine) translation of CN 108202729 A.
English (machine) translation of CN 113682288 A.
English (machine) translation of DE 10357121 A1.

* cited by examiner

SYSTEM AND METHOD FOR PREVENTING VEHICLE ROLL-AWAY

BACKGROUND OF THE INVENTION a. Field of the Invention

This invention relates to a system and method for braking a vehicle. In particular, the invention relates to a system and method for controlling a parking brake to apply the parking brake under certain conditions to prevent roll-away of the vehicle.

b. Background Art

Conventional wheel brakes on tractor-trailers and other commercial vehicles can be controlled to implement both service braking and parking or emergency braking. In the case of parking or emergency braking, the operator of the vehicle can manually apply the parking brake when desired. For example, an operator will typically apply the parking brake when the vehicle is stopped or parked and is not expected to begin moving for an extended period. The parking brake can also, however, be applied automatically in certain circumstances. For example, the applicant Bendix Commercial Vehicle Systems LLC offers a commercial braking system under the trademark "INTELLIPARK" in which the parking brake is applied automatically under certain conditions if the operator does not manually apply the parking brake in order to prevent unintended roll away of the vehicle. Under this system, the parking brake is automatically applied in conditions indicating that the vehicle should not be in motion such as an open cabin door or an unbuckled seat belt. Although this system functions well for its intended purpose, improvements to the system are desirable to help prevent roll-away of the vehicle when other conditions exist that are indicative of situations in which movement of the vehicle should not occur.

The inventors herein have recognized a need for a system and method for braking a vehicle that will minimize and/or eliminate one or more of the above-identified deficiencies.

BRIEF SUMMARY OF THE INVENTION

This invention relates to a system and method for braking a vehicle. In particular, the invention relates to a system and method for controlling a parking brake to apply the parking brake under certain conditions to prevent roll-away of the vehicle.

One embodiment of a system for braking a vehicle includes an operator interface configured to transmit a brake command signal in response to actuation of the operator interface by an operator of the vehicle. The system further includes a parking brake controller. The controller is configured, when the operator interface is not actuated by the operator and does not transmit the brake command signal, to receive a first signal indicative of whether the vehicle is in an active state or an inactive state from a first source and receive a second signal indicative of whether the vehicle is in the active state or the inactive state from a second source, different from the first source. The controller is further configured to determine that the vehicle is in the inactive state if both of the first and second signals indicate the vehicle is in the inactive state. The controller is further configured to receive a third signal indicative of a speed of the vehicle and determine, responsive to the third signal, whether the speed of the vehicle meets a predetermined condition relative to a predetermined speed of the vehicle. The controller is further configured to generate a control signal configured to apply a parking brake for a wheel of the vehicle after determining that the vehicle is the inactive state and determining that the speed of the vehicle meets the predetermined condition relative to the predetermined speed.

One embodiment of an article of manufacture includes a non-transitory computer storage medium having a computer program encoded thereon that when executed by a parking brake controller controls a parking brake for a wheel of a vehicle. The computer program includes code that is executed when an operator interface of the vehicle configured to transmit a brake command signal in response to actuation of the operator interface by an operator of the vehicle is not actuated by the operator and does not transmit the brake command signal. The computer program includes code for determining that the vehicle is in an inactive state if both of a first signal generated from a first source and a second signal generated from a second source, different from the first source, indicate the vehicle is the inactive state. The computer program further includes code for determining, responsive to a third signal indicative of a speed of the vehicle, whether the speed of the vehicle meets a predetermined condition relative to a predetermined speed of the vehicle. The computer program further includes code for generating a control signal configured to apply the parking brake after determining that the vehicle is the inactive state and determining that the speed of the vehicle meets the predetermined condition relative to the predetermined speed.

One embodiment of a method for braking a vehicle, when an operator interface of the vehicle configured to transmit a brake command signal in response to actuation of the operator interface by an operator of the vehicle is not actuated by the operator and does not transmit the brake command signal, includes receiving a first signal indicative of whether the vehicle is in an active state or an inactive state from a first source and receiving a second signal indicative of whether the vehicle is in the active state or the inactive state from a second source, different from the first source. The method further includes determining that the vehicle is in the inactive state if both of the first and second signals indicate the vehicle is the inactive state. The method further includes receiving a third signal indicative of a speed of the vehicle and determining, responsive to the third signal, whether the speed of the vehicle meets a predetermined condition relative to a predetermined speed of the vehicle. The method further includes generating a control signal configured to apply a parking brake for a wheel of the vehicle after determining that the vehicle is the inactive state and determining that the speed of the vehicle meets the predetermined condition relative to the predetermined speed.

A system and method for braking a vehicle in accordance the present teachings represent an improvement as compared to conventional systems and methods. In particular, the system and method disclosed herein automatically apply the parking brake in a situation when the vehicle is an inactive state and the operator has failed to manually apply the parking brake. Further, the system and method limit automatic application of the parking brake to situations in which the inactive state of the vehicle is confirmed by multiple sources and, further, when the vehicle is relatively stationary to allow the operator to coast to a stop in situations where a power failure occurs during regular operation and movement of the vehicle.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
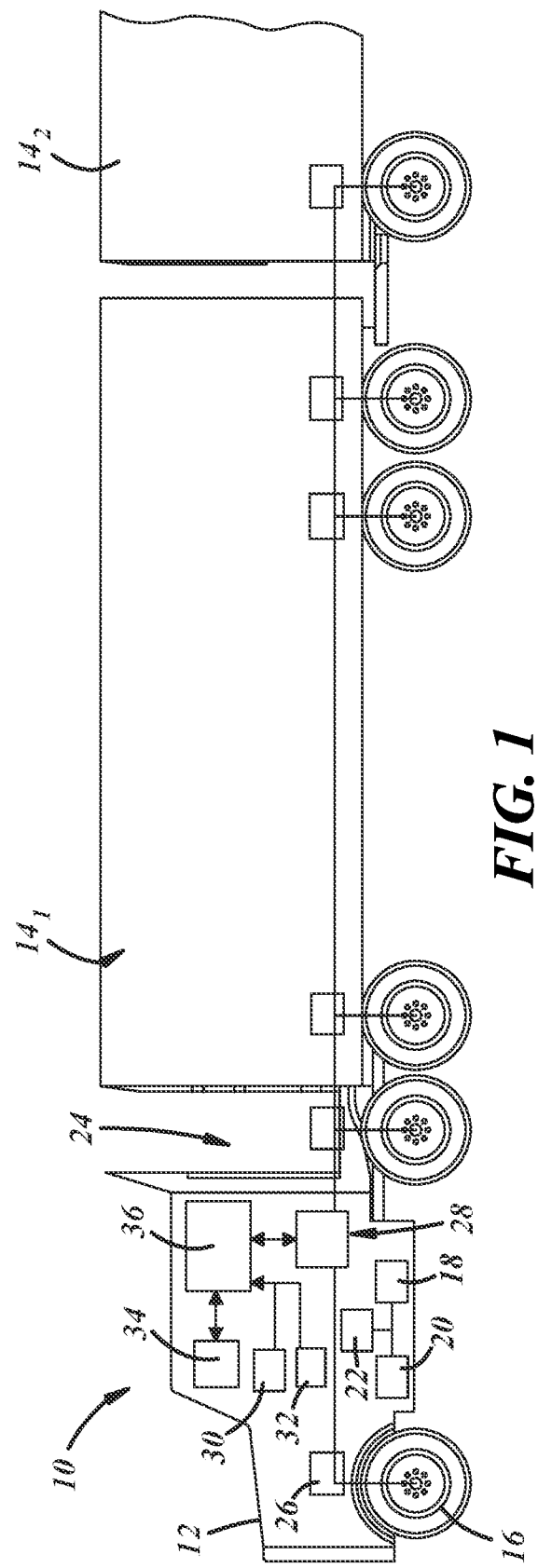
FIG. 1 is a diagrammatic view of a vehicle including one embodiment of a system for braking the vehicle in accordance with the teachings herein.

Referring now to the drawings wherein like reference numerals are used to identify identical components in the various views, FIG. 1 illustrates a vehicle 10. In the illustrated embodiment, vehicle 10 comprises a heavy commercial vehicle and, in particular, a tractor-trailer (also referred to as a semi) containing a tractor or power unit 12 and one or more trailers or towed units $14_1 \ldots 14_N$. It should be understood, however, that the inventions disclosed herein may find application on other types of commercial vehicles including, for example, tractors operating without trailers, buses, etc. and may also find application on non-commercial vehicles.

Tractor 12 provides power for moving trailers 14. Tractor 12 includes steering and drive axles each of which support one or more wheels 16 at either end. Tractor 12 further includes a power unit 18 such as an internal combustion engine or motor for generating mechanical energy used to rotate wheels 16. Tractor 12 further includes a battery 20 that provides electrical energy for use by various systems in vehicle 10 including, for example, lighting systems, power windows, locks and seating, and operator interface elements. Battery 20 also provides electrical energy for use in starting the power unit 18 and for use by the power unit 18 in generating the mechanical energy used to drive wheels 16. A start or ignition switch 22 in the cabin of tractor 12 and controlled by the operator of vehicle 10 controls a relay (not shown) used to deliver electrical energy from battery 20 to power unit 18 to transition vehicle 10 between an inactive state in which battery 20 does not provide electrical energy to power unit 18 and, therefore, power unit 18 cannot generate mechanical energy to rotate wheels 16 and an active state in which battery 20 provides electrical energy to power unit 18 to allow power unit to generate the mechanical energy required to rotate wheels 16.

Trailers $14_1 \ldots 14_N$ are provided to store freight and are detachably coupled to tractor 12. Each trailer 14 is supported on one or more trailer axles, each of which may support one or more wheels 16 at either end. Although a pair of trailers 14 are shown in the illustrated embodiment, it should be understood that the number of trailers 14 attached to tractor 12 may vary.

In accordance with the teachings herein, vehicle 10 further includes a system 24 for braking vehicle 10. System 24 is configured to brake one or more wheels 16 in order to slow or stop movement of vehicle 10. Braking system 24 may include one or more wheel brakes 26, a fluid circuit 28 that supplies fluid pressure to wheel brakes 26, sensors 30 and/or systems 32 that identify various conditions associated with vehicle 10 and the surrounding environment and that impact braking of vehicle 10, an operator interface 34 and one or more controllers 36. Although braking system 24 is described herein as a fluid braking system and, in particular, a pneumatic braking system, it should be understood that the system and method for braking vehicle 10 described hereinbelow could find application in connection with other forms of braking systems.

Wheel brakes 26 are configured to apply a braking force to one or more wheels 16. Brakes 26 may comprise disc brakes in which a carrier supports brake pads on opposite sides of a rotor rotating with the wheel 16 and an actuator causes, responsive to fluid pressure delivered by fluid circuit 28 or another force, movement of a caliper relative to the carrier to move the brake pads into and out of engagement with the rotor. Alternatively, wheel brakes 26 may comprise drum brakes in which an actuator such as a cam or piston causes, responsive to fluid pressure delivered by fluid circuit 28 or another force, movement of one or more brake shoes into engagement with a braking surface in a brake drum rotating with the wheel 16. Wheel brakes 26 may be configured to function as both a service brake for applying service braking while vehicle 10 is an active state and as a parking brake for applying parking or emergency braking while vehicle 10 is an active or inactive state.

Figure 2:
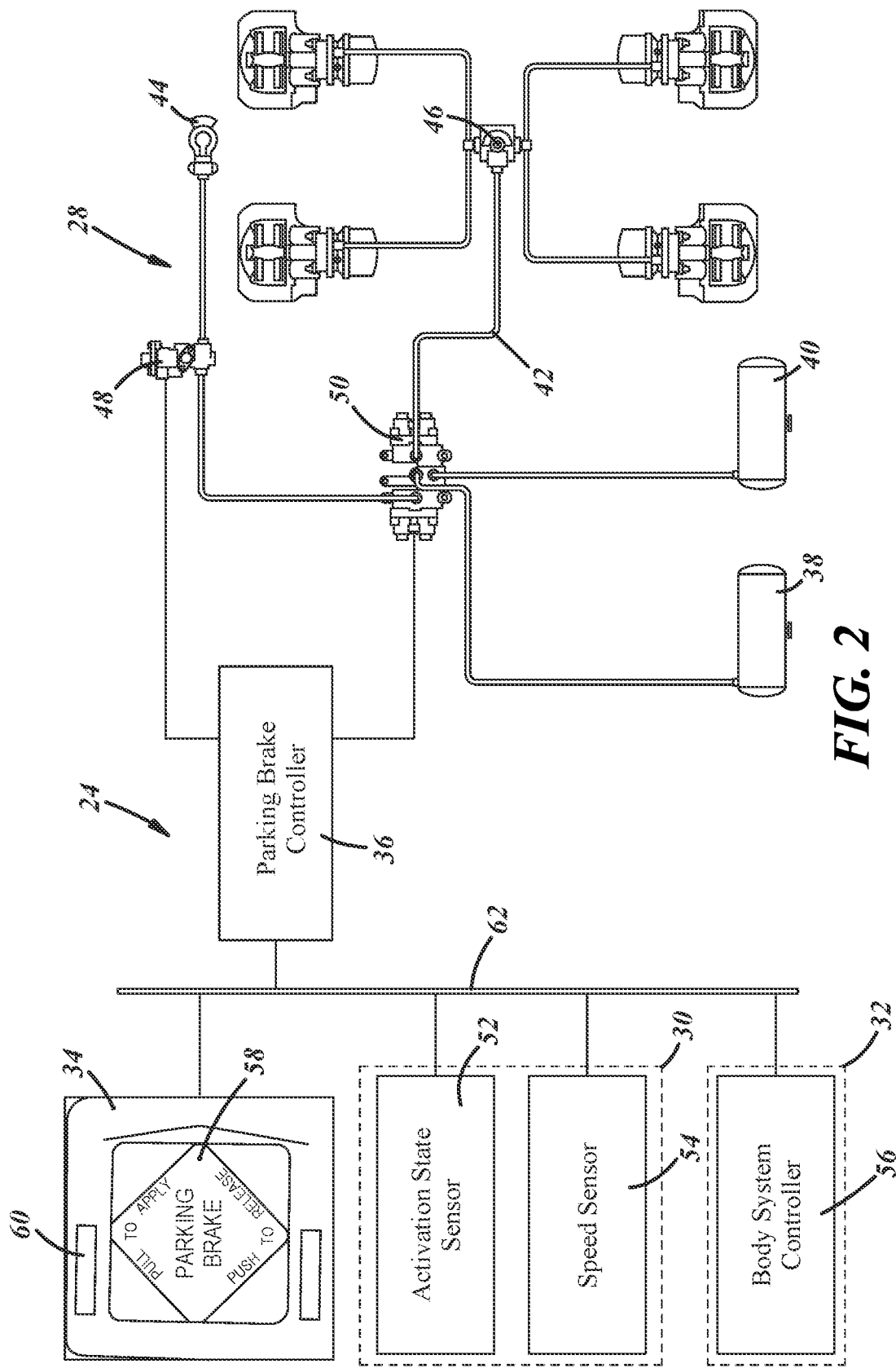
FIG. 2 is a diagrammatic view of one embodiment a system for braking the vehicle of FIG. 1 in accordance with the teachings herein.

Fluid circuit 28 generates fluid pressure within system 24 and controls the delivery of fluid pressure to the actuator of each wheel brake 26. Referring to FIG. 2, circuit 28 may include components for generating and storing pressurized fluid including fluid reservoirs 38, 40, compressors and air dryers and components for routing and delivering fluid pressure to wheel brakes 26 including fluid conduits 42, glad-hand connectors 44 between the tractor 12 and trailers 14, and a variety of valves including, for example, a foot pedal valve, a dash control valve, relay valves, modulator valves, quick release valves such as valve 46, and other valves such as tractor protection valve 48 and parking control valve 50. Quick release valve 46 increases the speed at which fluid pressure is exhausted from wheel brakes 26 on the drive axle when brakes 26 are released. Tractor protection valve 48 transmits pneumatic signals relating to operation of the trailer wheel brakes from tractor 12 to trailers 14. Valve 48 also protects the fluid supply for tractor 12 in the event of a brake in the fluid connection between tractor 12 and trailers 14. Parking control valve 50 delivers fluid to, and exhausts fluid from, wheel brakes 26 on both the drive axles in the tractor and the trailer axles in the trailer(s) (through tractor protection valve 48 and glad hand connector 44) in order to implement parking brakes in tractor 12 and trailer(s) 14. When valve 50 delivers fluid pressure to an actuator for a wheel brake 26, the fluid pressure opposes a spring force in the actuator to release the parking brake. When valve 50 exhausts fluid from the actuator for the wheel brake 26, the spring force sets the parking brake. Valves 48 and 50 may operate under the control of controller 36. A more detailed description of exemplary fluid circuits may be found in commonly assigned U.S. Pub. Nos. 2019/0299946 A1 and 2020/0114896 A1, the entire disclosures of which are incorporated herein by reference.

Sensors 30 are provided to identify various conditions associated with vehicle 10 and the surrounding environment that impact the operation of braking system 24. In accordance with the teachings herein, sensors 30 may include one or more activation state sensors 52 configured to generate signals indicative of whether vehicle 10 is in an active state or an inactive state. A variety of different sensors 30 may be used to generate signals indicative of whether the vehicle is in an active or inactive state. As noted above, vehicle 10 moves from an inactive state to an active state when battery 20 provides electrical energy to power unit 18 to allow power unit 18 to generate mechanical energy to rotate wheels 16. Therefore, activation state sensors 52 may comprise position sensors or other sensors indicative of the position or state of start or ignition switch 22, voltage or current sensors indicative of the delivery of voltage or current from battery 20 to power unit 18, sensors indicative of the operation of power unit 18 or exhaust systems (in vehicles where power unit 18 comprises an internal combustion engine) and positions sensors indicative of the movement of wheels 16 or power transmission elements between wheels 16 and power unit 18 all of which may provide an indication of whether vehicle 10 is an active or inactive state. In accordance with the teachings herein, sensors 30 may also include one or more speed sensors 54 configured to generate signals indicative of the speed of vehicle 10. For example, sensors 54 may include, an engine or transmission speed sensor that generates a signal indicative of the speed of vehicle 10. Alternatively, or in addition, sensors 54 may include wheel speed sensors that generate signals indicative of the rotational speed of a corresponding wheel 16 and from which controller 36 can determine the speed of vehicle 10 as well as whether certain wheels 16 are slipping and implement anti-lock braking through control of valves in fluid circuit 28. In addition to activation state sensors 52 and speed sensors 54, a variety of other sensors 30 may provide information to controller 36 indicative of conditions associated with vehicle 10 and the surrounding environment that may impact the operation of braking system 24. For example, sensors 30 may include pressure sensors that generate signals indicative of the fluid pressure within various fluid conduits 42 in fluid circuit 28, a steer angle sensor that generates a signal indicative of a steering angle imparted by a vehicle operator to a steering wheel in vehicle 10, a yaw rate sensor that generates a signal indicative of the angular velocity of vehicle 10 about its vertical (yaw) axis, load sensors that generate signals indicative of the forces at various locations on vehicle 10, position sensors that monitor the state of the brake pedal or other vehicle components and systems, and interlock sensors (in, for example, the cabin door, driver seat and/or seat belt), used to determine the absence of the vehicle operator for purposes of automatically setting the parking brake when the operator forgets to do so.

In addition to individual sensors 30, various vehicle systems 32 may generate signals that are indicative of conditions associated with vehicle 10 and the surrounding environment and that impact the operation of braking system 24 including, for example, the activation state of vehicle 10 and the speed of vehicle 10. In accordance with one embodiment, one such system 32 may comprise an ignition system used to control ignition of an internal combustion engine or start a motor in response to actuation of ignition or start switch 22. In accordance with other embodiments, systems 32 may comprise a vehicle body control system used to monitor and control various electronic systems in vehicle 10, a system used in monitoring and/or controlling power unit 18 (e.g., an engine control system) or an anti-lock braking (ABS) system. Each system 32 may include a controller 56 that is configured to communicate with controllers for a variety of other systems on vehicle 10. The controller 56 receives input signals from a variety of sensors 30 and systems 32 and other sources and transmits output signals to a variety of systems 32. Therefore, the controller 56 may generate signals indicative of the activation state of vehicle 10 and/or the speed of vehicle 10 responsive to input signals received from sensors 30 or other systems 32 and other sources (e.g., ignition or start switch 22).

Operator interface 34 provides an interface between the vehicle operator and system 24 through which the operator can control certain vehicle braking functions and receive information about vehicle braking. In the illustrated embodiment, interface 34 is provided to control the parking brake function of certain wheel brakes 26. In particular, interface 34 is used by the vehicle operator to request application of the parking brake (e.g., by exhausting fluid from a brake actuator for a wheel brake 26 to allow a spring to apply the parking brake) and release of the parking brake (e.g., by delivering fluid to the brake actuator for the wheel brake 26 opposing the spring to release the parking brake). Interface 34 may be mounted within the cabin of tractor 12 of vehicle 10 and, in particular, on the dashboard of vehicle 10. Interface 34 may include a handle 58 movable between a "pull" position (to apply the parking brake in the illustrated embodiment) and a "push" position (to release the parking brake in the illustrated embodiment) and a neutral position between the "push" and "pull" positions. When the operator actuates interface 34 and moves handle 58 to either a "pull" or "push" position, interface 34 generates and transmits a brake command signal to system 24 to apply or release brakes 26. When the operator does not actuate interface 34 and handle 58 remains in the neutral position, interface 34 does not generate or transmit a brake command signal to system 24. Interface 34 may include further include one or more indicators 60 such as lights (e.g., light emitting diodes) configured to convey information to the vehicle operator as discussed in greater detail below.

Controller 36 controls the operation of fluid circuit 28 in order to control the fluid pressure delivered to wheel brakes 26 and, therefore, the braking force applied to the wheels 16. In this manner, controller 36 may be configured to implement parking/emergency braking and service braking as well as anti-lock braking (ABS), traction control and stability control when required. Controller 36 may also control the outputs of certain user interfaces including operator interface 34. Controller 36 may comprise a programmable microprocessor or microcontroller or may comprise an application specific integrated circuit (ASIC). Controller 36 may include a memory and a central processing unit (CPU). Controller 36 may also include an input/output (I/O) interface including a plurality of input/output pins or terminals through which the controller 36 may receive a plurality of input signals and transmit a plurality of output signals. The input signals may include signals received from sensors 30 and systems 32 and user interfaces such as operator interface 34. The output signals may include signals used to control components of fluid circuit 28 such as valves 48, 50 and signals used to control outputs on user interfaces such as operator interface 34. Controller 36 may be configured to communicate with one or more components of braking system 24 such as fluid circuit 28, sensors 30, systems 32 and operator interface 34 directly using dedicated (hard) wire connections. Alternatively, or in addition, controller 36 may be configured to communicate with one or more components of braking system 24 such as fluid circuit 28, sensors 30, systems 32 and operator interface 34 using a conventional vehicle communication bus 62 implementing a communications network such as a controller area network (CAN) (or another communication medium such as power line communication (PLC)) and to communicate with other vehicle systems over the same or a similar bus including, for example, advanced driver assistance systems such as collision avoidance systems that are configured to implement automated emergency braking of the vehicle wheels 16 under certain conditions. Communications may be carried out over the communications bus 62 in accordance with various industry standard protocols including by not limited to SAE J1939, SAEJ1922, and SAE J2497 or using a proprietary protocol. Although a single controller 36 is shown in the illustrated embodiment, it should be understood that the functions of controller 36 may be divided among multiple controllers located on tractor 12 and trailers 14 that are in communication with one another.

Figure 3:
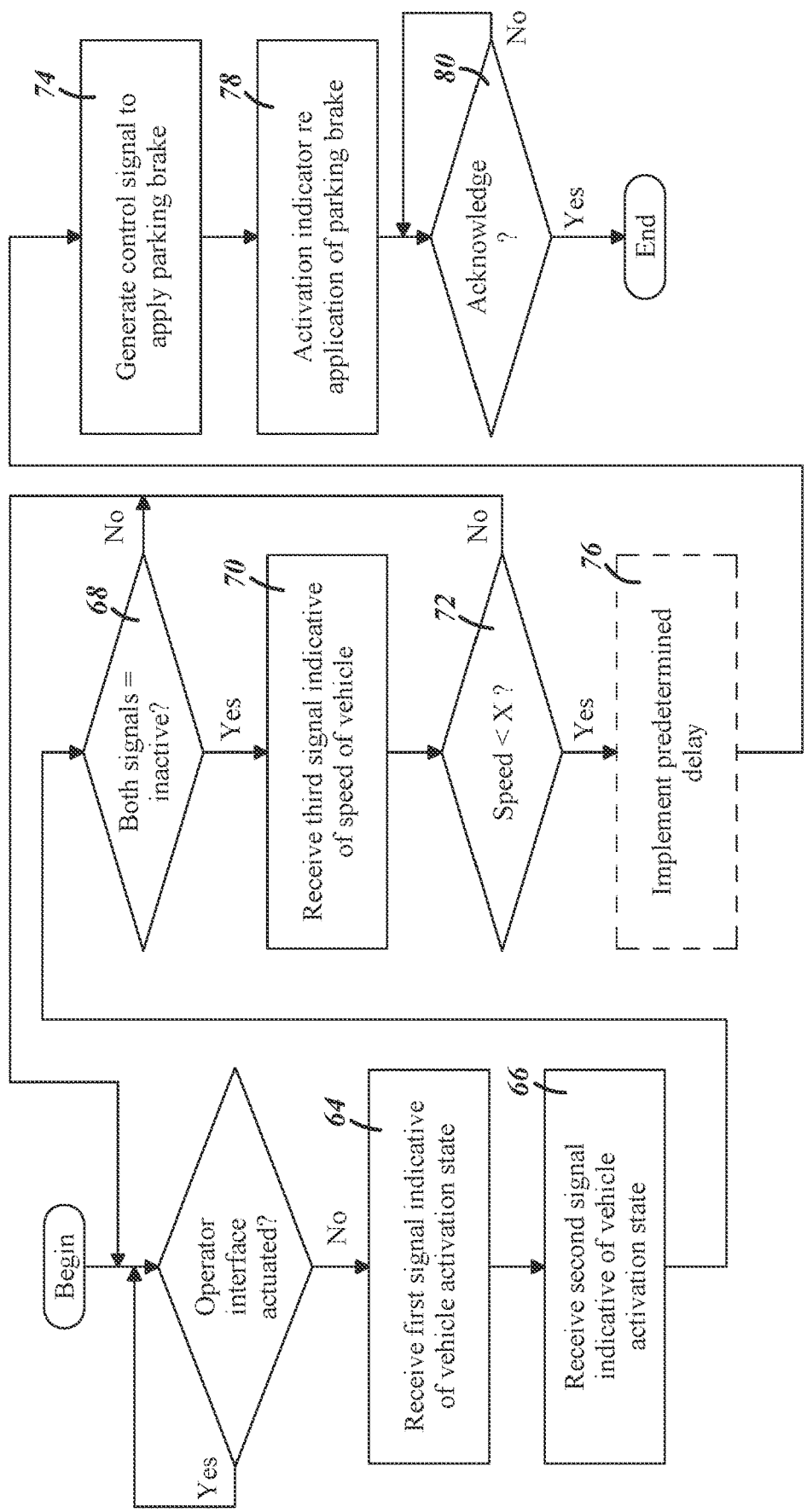
FIG. 3 is a flow chart diagram illustrating steps in one embodiment of a method for braking a vehicle in accordance with the teachings herein.

Referring now to FIG. 3, controller 36 may be configured with appropriate programming instructions (i.e., software or a computer program) to implement various steps in a method for braking vehicle 10. The instructions or computer program may be encoded on a non-transitory computer storage medium such as a memory within, or accessible by, controller 36. The program and method are intended to automatically apply the parking brake 26 in a situation when the vehicle 10 is an inactive state, but the operator has failed to manually apply the parking brake 26. Therefore, the program and method are preferably executed only during periods in which operator interface 34 has not been actuated by an operator of vehicle 10 and interface 34 is in a neutral position (and not in the "pull" or "push" positions) and is not generating or transmitting a brake command signal configured to apply or release brake 26. The method may begin with the steps 64 of receiving a first signal indicative of whether vehicle 10 is in an active state or an inactive state from a first source. As set forth above, vehicle 10 is an inactive state when battery 20 is not providing electrical energy to power unit 18 such that power unit 18 cannot generate mechanical energy to rotate wheels 16. Conversely, vehicle 10 is an active state when battery 20 provides electrical energy to power unit 18 to allow power unit 18 to generate the mechanical energy required to rotate wheels 16. Also as set forth above, a variety of sensors 30 and systems 32 on vehicle 10 are capable of generating signals indicating whether vehicle 10 is an active or inactive state and the first source may comprise any of these sensors 30 or systems 32. In various embodiments, the source may, for example, comprise a sensor 30 indicative of the position or state of start or ignition switch 22 or voltage or current sensors indicative of the delivery of voltage or current from battery 20 to power unit 18. The source may alternatively comprise a controller 56 for a system 32 such as an ignition system, a body control system, engine control system or anti-lock braking system. For example, if the controller 56 for the ignition system indicates that the ignition switch 22 is in an off position, the engine control system indicates the engine is operating at zero (0) rpm or the controller 56 for the anti-lock braking control system has stopped broadcasting signals, this information is indicative of vehicle 10 in an inactive state. The method may continue with the step 66 of receiving a second signal indicative of whether vehicle 10 is in the active state or the inactive state. The second signal is received is obtained from a second source that is different than the first source. Again, the second source may comprise any of sensors 30 or systems 32 as long as the second source is not the same as the first source. By using multiple different sources, system 24 provides protection against the possibility of an error in a signal from one source. Although the inventive system contemplates the use of two signals from two different sources indicative of the state of activation of vehicle 10, it should be understood system 24 could be configured to receive additional signals from additional, different sources to further increase certainty in determining the state of activation of vehicle 10.

After receiving the first and second signals, the method may continue with the step 68 of determining that vehicle 10 is in the inactive state if both of the first and second signals indicate the vehicle is the inactive state. System 24 is configured to determine that vehicle 10 is the inactive state only if both of the first and second signals indicate vehicle 10 is an inactive state to reduce the possibility that the parking brake will ultimately be applied (i.e., anti-roll away measures implemented) while the vehicle is an active state. Therefore, system 24 determines that vehicle 10 is an active state if either signal indicates vehicle 10 is an active state or if the state of vehicle 10 cannot be determined from one or both of the signals (i.e., there is a fault in either signal) and only determines that vehicle 10 is an inactive state if both signals indicate vehicle 10 is an inactive state. If system 24 determines that vehicle 10 is an active state, no action is taken and the process returns to the beginning to continue monitoring the actuation of the operator interface 34 and, if the operator interface 34 is not actuated, the activation state of vehicle 10.

If system 24 determines that vehicle 10 is an inactive state, the method may proceed to the steps 70, 72 of receiving a third signal indicative of a speed of vehicle 10 and determining, responsive to the third signal, whether the speed of vehicle 10 meets a predetermined condition relative to a predetermined speed. The third signal may be provided by one of sensors 30 or systems 32. In the event of a loss of battery power (and provision of current from battery 20 to power unit 18), vehicle 10 may assume an inactive state even while in motion. Depending on the speed at which vehicle 10 is traveling, application of the parking brake in this situation may create a risk of damage to vehicle 10 and injury to the operator. Further, application of the parking brake would prevent the operator from coasting and slowly bringing vehicle 10 to a stop. Therefore, system 24 does not rely on a determination of the vehicle activation state alone in deciding whether to apply the parking brake, but instead also considers the speed of vehicle 10 and determines whether the speed meets a predetermined condition relative to predetermined speed. The predetermined condition may, for example, be that the speed is less than a predetermined speed or is less than or equal to predetermined speed, or within a certain range of a predetermined speed, etc. In the illustrated embodiment, steps 70, 72 are illustrated as occurring after steps 64, 66, 68. It should be understood, however, that the order of the steps may vary and, for example, steps 70, 72 may be performed prior to steps 64, 66, 68 such that steps 64, 66, 68 are only performed if system 24 determines in step 72 that speed meets the predetermined condition relative to the predetermined speed. If system 24 determines that the speed of vehicle 10 does not meet the predetermined condition relative to the predetermined speed (e.g., is not less than the predetermined speed) or the speed cannot be determined from the signal (i.e., there is a fault in the signal) no action is taken and the process returns to the beginning to continue monitoring the actuation of the operator interface 34 and, if the operator interface 34 is not actuated, the activation state of vehicle 10.

If system 24 determines that the speed of vehicle 10 meets the predetermined condition relative to the predetermined speed, the method may continue with the step 74 of generating a control signal configured to apply one or more of brakes 26 for wheels 16 of vehicle 10. As shown in FIG. 3, in some embodiments, step 74 may occur after implementing a predetermined delay period 76. The delay period may, for example, provide time to generate a communication to the vehicle operator that the brakes 26 are going to be applied. The control signal may be directed to valve 50 to cause valve 50 to exhaust fluid pressure from a brake actuator for a brake 26 such that the brake actuator applies the brake 26. As a result, system 24 prevents unintentional movement (roll away) of vehicle 10 during periods when vehicle 10 is in inactive state. In accordance with certain embodiments of system 24, system 24 generates the control signal in step 76 despite faults or errors that may exist in other signals that may be used by system 24 in determining whether to apply a parking brake 26 including signals generated by pressure sensors in fluid circuit 28, signals generated by operator interface 34 and signals generated by interlock sensors 30 (in, for example, the cabin door, driver seat and/or seat belt), used to determine the absence of the vehicle operator for purposes of automatically setting the parking brake when the operator forgets to do so.

After generating the control signal, system 24 may implement additional steps to alert the operator of vehicle 10 to the automated application of the parking brake. In addition to notifying the operator to the change in the status of the brake, this action can assist in operator education to reduce the risk of roll away events in the future. Referring again to FIG. 3, the method may therefore continue with the step 78 of activating an indicator indicative of application of the parking brake in response to the control signal. Referring to FIG. 2, the indicator 60 may, for example, comprise a visual indicator such as one or more lights on interface 34 that remain illuminated or that flash on and off. It should be understood, however, that the indicator may comprise any of a visual, audio or haptic indicator. Referring again to FIG. 3, the method may continue with the step 80 of deactivating the indicator 60 only after receiving an acknowledgement signal generated in response to an input from an operator of the vehicle. In this manner, the operator is forced to acknowledge the automated application of the parking brake. Referring again to FIG. 2, the acknowledgement signal may be generated, for example, in response to movement of handle 58 of interface 34.

A system 24 and method for braking a vehicle 10 in accordance the present teachings represent an improvement as compared to conventional systems and methods. In particular, the system 24 and method disclosed herein automatically apply the parking brake 26 in a situation when the vehicle 10 is an inactive state and the operator has failed to manually apply the parking brake 26. Further, the system 24 and method limit automatic application of the parking brake 26 to situations in which the inactive state of the vehicle is confirmed by multiple sources and, further, when the vehicle 10 is relatively stationary to allow the operator to coast to a stop in situations where a power failure occurs during regular operation and movement of the vehicle 10.

While the invention has been shown and described with reference to one or more particular embodiments thereof, it will be understood by those of skill in the art that various changes and modifications can be made without departing from the spirit and scope of the invention.

What is claimed is:

1. A system for braking a vehicle, comprising:
an operator interface configured to transmit a brake command signal in response to actuation of the operator interface by an operator of the vehicle; and,
a parking brake controller configured, when the operator interface is not actuated by the operator and does not transmit the brake command signal, to
receive a first signal indicative of whether the vehicle is in an active state or an inactive state from a first source, the first signal independent of a presence or absence of the operator of the vehicle;
receive a second signal indicative of whether the vehicle is in the active state or the inactive state from a second source, different from the first source, the second signal independent of the presence or absence of the operator of the vehicle;
determine that the vehicle is in the inactive state if both of the first and second signals indicate the vehicle is in the inactive state;
receive a third signal indicative of a speed of the vehicle; and,
determine, responsive to the third signal, whether the speed of the vehicle meets a predetermined condition relative to a predetermined speed of the vehicle; and,
generate a control signal configured to apply a parking brake for a wheel of the vehicle after determining that the vehicle is the inactive state and determining that the speed of the vehicle meets the predetermined condition relative to the predetermined speed.

2. The system of claim 1 wherein the vehicle is in the active state when a battery on the vehicle is providing electrical energy to an engine or motor on the vehicle that is configured to generate mechanical energy to cause rotation of the wheel.

3. The system of claim 1 wherein one of the first and second sources is a controller for a vehicle body control system on the vehicle.

4. The system of claim 1 wherein the parking brake controller generates the control signal following a predetermined delay period after determining that the vehicle is the inactive state and after determining that the speed of the vehicle meets the predetermined condition relative to the predetermined speed.

5. The system of claim 1 wherein the parking brake controller is further configured to
activate an indicator indicative of application of the parking brake in response to the control signal; and,
deactivate the indicator only after receiving an acknowledgement signal generated in response to an input from an operator of the vehicle.

6. The system of claim 1 wherein the parking brake controller determines that the vehicle is in the active state if either of the first and second signals indicate the vehicle is the active state.

7. The system of claim 1 wherein at least one of the first signal and the second signal is received by the parking brake controller over a communications network on the vehicle.

8. An article of manufacture, comprising:
a non-transitory computer storage medium having a computer program encoded thereon that when executed by a parking brake controller controls a parking brake for a wheel of a vehicle, the computer program including code for, when an operator interface of the vehicle configured to transmit a brake command signal in response to actuation of the operator interface by an operator of the vehicle is not actuated by the operator and does not transmit the brake command signal,
determining that the vehicle is in an inactive state if both of a first signal generated from a first source and a second signal generated from a second source, different from the first source, indicate the vehicle is the inactive state, the first signal and the second signal independent of a presence or absence of the operator of the vehicle;

determining, responsive to a third signal indicative of a speed of the vehicle, whether the speed of the vehicle meets a predetermined condition relative to a predetermined speed of the vehicle; and, generating a control signal configured to apply the parking brake after determining that the vehicle is the inactive state and determining that the speed of the vehicle meets the predetermined condition relative to the predetermined speed.

9. The article of manufacture of claim 8 wherein the vehicle is in the active state when a battery on the vehicle is providing electrical energy to an engine or motor on the vehicle that is configured to generate mechanical energy to cause rotation of the wheel.

10. The article of manufacture of claim 8 wherein one of the first and second sources is a controller for a vehicle body control system on the vehicle.

11. The article of manufacture of claim 8 wherein the code for generating the control signal is executed only after a predetermined delay period after determining that the vehicle is the inactive state and after determining that the speed of the vehicle meets the predetermined condition relative to the predetermined speed.

12. The article of manufacture of claim 8 wherein the computer program further includes code for:
activating an indicator indicative of application of the parking brake in response to the control signal; and,
deactivating the indicator only after receiving an acknowledgement signal generated in response to an input from an operator of the vehicle.

13. The article of manufacture of claim 8 wherein the computer program further includes code for determining that the vehicle is in the active state if either of the first and second signals indicate the vehicle is the active state.

14. The article of manufacture of claim 8 wherein at least one of the first signal and the second signal is received by the parking brake controller over a communications network on the vehicle.

15. A method for braking a vehicle when an operator interface of the vehicle configured to transmit a brake command signal in response to actuation of the operator interface by an operator of the vehicle is not actuated by the operator and does not transmit the brake command signal, comprising:
receiving a first signal indicative of whether the vehicle is in an active state or an inactive state from a first source, the first signal independent of a presence or absence of the operator of the vehicle;
receiving a second signal indicative of whether the vehicle is in the active state or the inactive state from a second source, different from the first source, the second signal independent of the presence or absence of the operator of the vehicle;
determining that the vehicle is in the inactive state if both of the first and second signals indicate the vehicle is the inactive state;
receiving a third signal indicative of a speed of the vehicle; and,
determining, responsive to the third signal, whether the speed of the vehicle meets a predetermined condition relative to a predetermined speed of the vehicle; and,
generating a control signal configured to apply a parking brake for a wheel of the vehicle after determining that the vehicle is the inactive state and determining that the speed of the vehicle meets the predetermined condition relative to the predetermined speed.

16. The method of claim 15 wherein the vehicle is in the active state when a battery on the vehicle is providing electrical energy to an engine or motor on the vehicle that is configured to generate mechanical energy to cause rotation of the wheel.

17. The method of claim 15 wherein one of the first and second sources is a controller for a vehicle body control system on the vehicle.

18. The method of claim 15, further comprising the step of implementing a predetermined delay period after determining that the vehicle is the inactive state and after determining that the speed of the vehicle meets the predetermined condition relative to the predetermined speed and prior to generating the control signal.

19. The method of claim 15, further comprising:
activating an indicator indicative of application of the parking brake in response to the control signal; and,
deactivating the indicator only after receiving an acknowledgement signal generated in response to an input from an operator of the vehicle.

20. The method of claim 15, further comprising determining that the vehicle is in the active state if either of the first and second signals indicate the vehicle is the active state.

* * * * *